May 22, 1945.    H. S. JONES    2,376,598
MEASURING APPARATUS
Filed Jan. 23, 1943    2 Sheets-Sheet 2
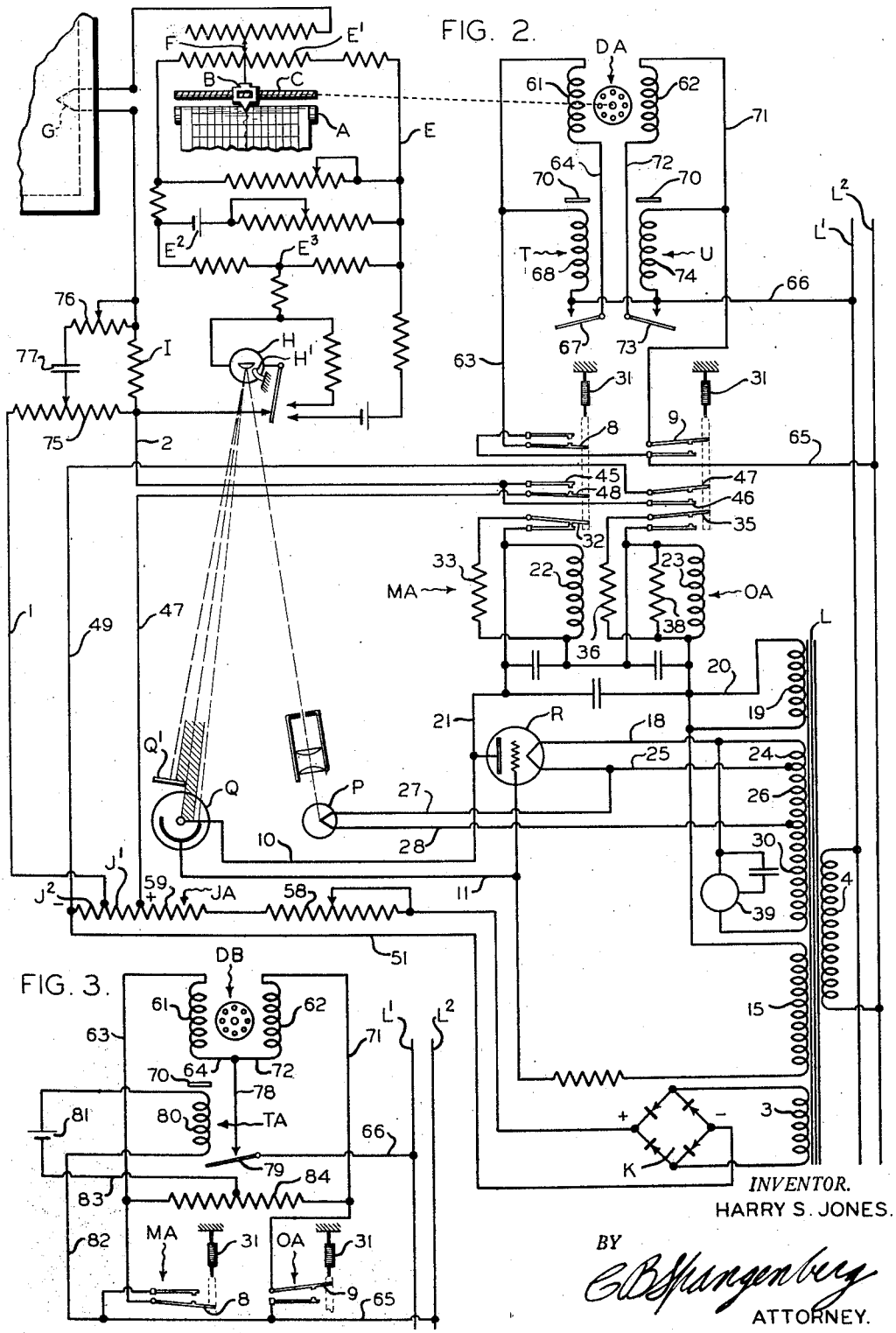
INVENTOR.
HARRY S. JONES.
BY
C. B. Spangenberg
ATTORNEY.

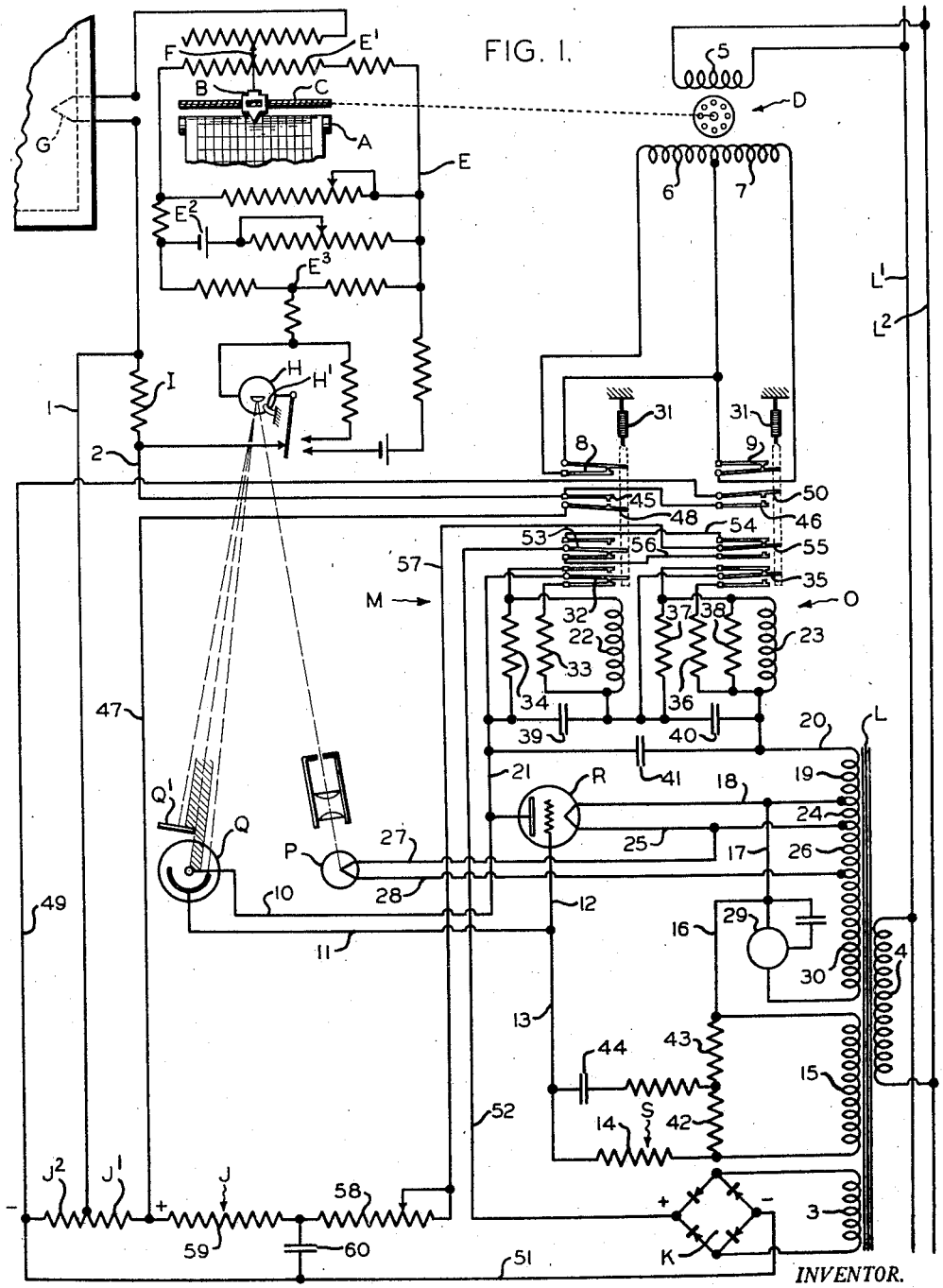
FIG. I.
INVENTOR.
HARRY S. JONES.
BY
C.B. Spangenberg
ATTORNEY.

Patented May 22, 1945

2,376,598

UNITED STATES PATENT OFFICE 2,376,598

MEASURING APPARATUS

Harry S. Jones, Washington, D. C., assignor to The Brown Instrument Company, Philadelphia, Pa., a corporation of Pennsylvania Application January 23, 1943, Serial No. 473,343

13 Claims. (Cl. 172—239)

The general object of the present invention is to provide a self-balancing potentiometer with a novel and effective means for including an anticipating control action in the potentiometer rebalancing operations so as to eliminate or substantially minimize the hunting tendency which is an inevitable result of failure to terminate the rebalancing operations promptly enough to avoid over adjustments of the potentiometer circuit.

The present invention is of especial utility in self-balancing potentiometers of the type in which rebalancing operations are rapidly effected as soon as required, by means comprising a reversibly rotatable rebalancing motor controlled by the deflection of a galvanometer which is continuously free to deflect away from and back toward a balancing position as the potentiometer circuit is unbalanced by a change in the thermocouple or other voltage measured, and is rebalanced by the adjustment of a sliding contact along a potentiometer slide wire resistance which the motor effects by bodily moving the contact or the slide wire resistance. Such a motor has a tendency to "coast," or continue in operation after being deenergized, and thus has a tendency to continue its adjustment of the sliding contact after the motor has been deenergized.

The Fairchild and Parsegian Patent 2,267,682 of December 23, 1941, discloses a self-balancing potentiometer of the above mentioned type including means operating in the course of each rebalancing operation to effect a temporary adjustment in the bridge circuit portion of the potentiometer network which returns the galvanometer to its balancing position before the rebalancing motor has moved the sliding contact into its new balancing position along the potentiometer resistance, to the end that the coasting movement of the motor following its deenergization will complete the movement of the contact into but not beyond its proper rebalancing position.

The above mentioned temporary adjustment of the bridge circuit is undesirable and one specific object of the present invention is to advance the return of the galvanometer by impressing a voltage on the galvanometer or detection circuit branch connected to the potentiometric network, by the operations of means external to and independent of the bridge circuit.

The magnitude of each galvanometer advancement control action effected with the means disclosed in said patent, is substantially fixed and does not vary with the extent of the corresponding rebalancing operation, whereas the extent of the coasting movement of the motor customarily increases as the extent of the rebalancing operation increases, and a specific object of the present invention is to provide means for effecting a galvanometer advancement control action which is graduated in accordance with the extent of the corresponding rebalancing operation.

A still more specific object of the present invention is to provide simple and effective means for producing graded anticipating control effects by impressing an anticipating control voltage on the detection circuit branch including the thermocouple or other source of voltage to be measured and the galvanometer or analogous means which responds to the current flowing in said circuit branch when the potentiometer is unbalanced. The magnitude of the anticipating control voltage which is impressed in accordance with the present invention on the detection circuit branch in the course of each rebalancing operation, is automatically dependent upon and increases with the magnitude of that rebalancing operation.

The general principles of the present invention may be embodied in apparatus differing in respect to the type of rebalancing motor and motor control provisions employed, and my invention in some of its forms comprises improvements in rebalancing motor and motor control provisions, which are not employed in other forms of apparatus in which I have embodied the general principles of the present invention.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a diagrammatic representation of one embodiment of the invention.

Fig. 2 is a diagrammatic representation of a second embodiment of the invention; and Fig. 3 is a diagram illustrating a modification of the rebalancing motor circuit arrangement shown in Fig. 2.

The embodiment of the invention diagrammatically illustrated in Fig. 1 comprises a self-balancing potentiometer instrument A of known type, including a pen carriage B adjusted by the rotation of a threaded spindle C. The latter is rotated by a motor D in one direction or the other when and as required to rebalance the potentiometer. The potentiometer rebalancing operation is effected by the adjustment of a contact F along the slide wire resistance E' included in the potentiometer network E. As diagrammatically shown, the contact F is mounted on and moved by the pen carriage B. The network E includes an energizing battery E². The detection circuit branch includes a furnace thermocouple G which constitutes the source of voltage measured, and also includes a galvanometer H deflecting in response to current flow through said detection circuit branch. One end of said circuit branch is connected to the network E through the sliding contact F and said branch has its other end connected to the network at a point E³ displaced from the contact F so that in the balanced condition of the potentiometer, the difference between the potentials of the contact F and point E³ is equal in magnitude and opposite in direction to the thermocouple voltage. On a variation in the thermocouple voltage the resultant deflection of the galvanometer H out of its balancing position, energizes the motor D for operation to adjust the contact F into a new balancing position of said contact, in which the potential difference between the latter F and the point E³ neutralizes the new voltage of the thermocouple.

The means shown in Fig. 1 for advancing the return of the galvanometer to its balancing position in accordance with the present invention comprises a resistance I in series with the thermocouple G and galvanometer H in the detection circuit branch, conductors 1 and 2 connected to the terminals of the resistance I, and means hereinafter described for creating the desired potential difference between the conductors 1 and 2. Except in respect to the resistance I and the conductor connections 1 and 2, the potentiometric circuit network E shown in Fig. 1 is of well known type which is illustrated and described, for example, in the Harrison et al. Patent 2,150,502 granted March 14, 1939, and a detailed description herein of the network E is therefore unnecessary. The apparatus shown in Fig. 1 differs essentially from apparatus disclosed in the above mentioned Patent 2,267,682, moreover, only in respect to the means employed for advancing the return of the galvanometer to its balancing position in the course of each rebalancing operation.

The difference between the potentials impressed by the conductors 1 and 2 on the terminals of the anticipating control resistance I, is produced by current flow through a resistance J' when the potentiometer circuit is unbalanced in one direction, and is produced by current flow through a second resistance J² when the potentiometer circuit is unbalanced in the opposite direction. The resistances J' and J² are connected end to end in a resistive-capacitive energizing circuit network J through which current is caused to flow when the potentiometer is unbalanced, by a full wave rectifier K. The network J is more fully described hereinafter. The rectifier is energized by the section 3 of the secondary winding of a transformer L, which has its primary winding 4 connected to alternating current supply conductors L' and L². The conductor 1 is connected to the adjacent terminals of the resistances J' and J², and the conductor 2 is adapted to be operatively connected, as hereinafter described, to the second terminal of the resistance J' when the potentiometer circuit is unbalanced as a result of an increase in the voltage of the thermocouple G, and to be operatively connected to the second terminal of the resistance section J², when said circuit is unbalanced by a decrease in the thermocouple voltage. When the conductor 2 is connected to the second terminal of resistance J' the polarity of the anticipating control voltage impressed on the detection circuit through the resistance I is in one direction, and the polarity of that voltage is in the opposite direction when the conductor 2 is operatively connected to the resistance section J².

As diagrammatically shown, the motor D is of a type comprising energizing winding 5 connected between the supply conductors L' and L², and comprising two shading pole windings 6 and 7, so disposed that the motor D will operate in one direction or the other when one or the other of the two windings 6 and 7 is short circuited, or closed on itself, and the second of the two windings is open circuited. In the balanced condition of the potentiometer, each of the shading pole windings 6 and 7 of the motor D is closed, and the motor D is thereby subjected to a stalling or braking action. The operation of the motor D is directly controlled by electromagnetic switch relays M and O through adjustments of their respective switch contacts 8 and 9 respectively connected to the terminals of the windings 6 and 7, and the operative condition of each of the relays M and O is controlled by the deflection of the galvanometer H.

The galvanometer H is of the type comprising a mirror receiving light transmitted through a condensing lens system from a lamp P. More or less of the light received by the galvanometer mirror is reflected to a photoelectric cell Q. The galvanometer H, the cell Q and a light shield Q' are so relatively disposed that in the balanced condition of the potentiometer half of the light reflected by the galvanometer mirror will be received by the cell Q and the other half of the reflected light will impinge on the shield Q'. In consequence, when the galvanometer deflects counter-clockwise out of its balancing position, it decreases the amount of light impinging against the shield Q' and increases the light received by the photoelectric cell Q, and the deflection of the galvanometer away from its balancing position in the clockwise direction decreases the amount of light received by the cell Q. The galvanometer H includes a stop H' which prevents the galvanometer from deflecting counter-clockwise beyond the position in which the photo cell illumination is at a maximum.

The photo-electric cell voltage created by the light received by the cell Q directly controls the control grid potential of an electronic amplifying tube R, and the energization of each of the relays M and O is selectively controlled by the magnitude of the plate current of the tube R. The circuit connections shown in Fig. 1 through which the photo-electric cell Q thus indirectly controls the energization of the relays M and O include a conductor 10 which connects the anode of the cell Q to the plate element of electronic tube R. The latter is a triode and has its control grid connected to the cathode of the photoelectric cell Q by conductors 11 and 12. The previously mentioned transformer L supplies the various required voltages to the motor control circuit which includes the cell Q, the tube R and various resistances and condensers hereinafter referred to. The control grid of the tube R is connected by conductors 12 and 13 and a resistance 14 to the one terminal of a secondary winding section 15 of the transformer L, that terminal being the so called "negative" terminal of the portion of the secondary winding of the transformer L supplying voltage to the motor control circuit. The second terminal of the secondary winding section 15 is connected by conductors 16 and 17 to a conductor 18 which connects one terminal of the cathode filament of the tube R to one terminal of a section 19 of the secondary winding of the transformer L.

The other terminal, 20, of the secondary winding 19 forms the "positive" terminal of the portion of the secondary winding of the transformer which is used to supply voltage to the motor control circuit. The terminal 20 is connected to the plate of the tube R through a circuit branch which includes a conductor 21, the energizing winding 22 of the relay M and the energizing winding 23 of the relay O, all of which are always connected in series with one another. Said circuit branch also includes other resistances associated with the windings 22 and 23 in various ways to give the relays oscillating characteristics as hereinafter described.

The cathode filament of the tube R is supplied with current by a secondary winding section 24 of the transformer L which has one terminal connected to one end of the filament by the previously mentioned conductor 18, and has its second terminal connected to the other end of the filament by a conductor 25. Another transformer secondary winding section 26 supplies current to the lamp P through conductors 25, 27 and 28. As shown, a synchronous motor 29 which may be used to give movement to the record chart of the instrument A is energized by connection of its terminals through conductors 17 and 18, and a conductor 30 to the terminals of a suitable portion of the secondary winding of the transformer L.

Each of the relays M and O, as diagrammatically shown in Fig. 1, comprises a plurality of stationary lower, or front contacts, a plurality of stationary upper, or back contacts and a plurality of movable contacts. When the current flow through the energizing winding of each relay is too small to prevent the corresponding relay biasing spring 31 from maintaining the relay in its open condition, the various back contacts of the relay are engaged by the corresponding movable contacts, but on a sufficient increase in the current flowing through the energizing winding of the relay, the latter closes, and the different stationary front contacts are then engaged by the corresponding movable contacts.

In the balanced condition of the potentiometer the current flow through the energizing winding 22 of the relay M is large enough to maintain that relay in its closed position, but the current then flowing through the energizing winding 23 of the relay O is too small to prevent the relay O from being then maintained in its open position by its spring 31.

When the balanced condition of the potentiometer is disturbed, for example, by a decrease in the voltage of the thermocouple G and a resultant-counter-clockwise deflection of the galvanometer H, the current in the plate circuit of the tube R will increase sufficiently to cause the energizing coil 23 of the relay O to close that relay, and when the potentiometric circuit is unbalanced in the opposite direction, the current flow in the plate circuit of the tube R is decreased so that the energizing winding 22 of the relay M will no longer overcome the tendency of the corresponding spring 31 to open the front contacts and close the back contacts of that relay.

As hereinafter explained, the resistance J' is operatively effective on the resistance I only when the currents through the energizing windings of the relays are too weak to close either relay, and the resistance $J^2$ is operatively effective on the resistance I only when the current flow through the energizing windings of the relays I are strong enough to close both relays.

While a small increase or decrease in the plate current of the tube R from its normal or circuit balancing value, will close the relay O or open the relay M respectively, the change in the relay condition thus produced will not be continuously maintained. On the contrary, when the value of the plate current of the tube R is within a certain range below the circuit balancing value of the current, the relay M will oscillate back and forth between its open and closed conditions, and the relay O will similarly oscillate when the plate current value is within a certain range above its circuit balancing value. When the plate current rises above the last mentioned range, the relay O will cease to oscillate and will remain continuously closed, and when the plate current value falls below the first mentioned range, the relay M will cease to oscillate and will remain continuously open. The oscillation of each relay results from the fact that for a given value of the tube R plate current, the current flowing through the energizing winding of the relay is appreciably smaller when the relay is in its closed position than when it is in its open position.

In the closed position of the relay M, its lowermost movable contact 32 engages the lowermost stationary front contact of the relay, with the result that the winding 22 is then connected in series with a resistance 34, and a resistance 33 is connected in shunt to the winding 22 and resistance 34. As the relay M opens and the contact 32 disengages the lowermost stationary front contact, the shunt resistance 33 is open-circuited, and when the contact 32 engages the corresponding stationary back contact, the resistance 34 is short-circuited. The oscillation of the relay O directly results from the fact that when the relay is closed its lower movable contact 35 connects a resistance 36 in shunt to the winding 23 and a resistance 37, the latter being then in series with the winding 23; and that when the relay O is opened the contact 35 open-circuits the resistance 36 and short-circuits the resistance 37. As shown, a resistance 38 is permanently connected in shunt to the winding 23 so that the winding 23 of the relay O may be a duplicate of the winding 22 of the relay M and still be ineffective to close the relay O, except when the plate current of the tube R is suitably higher than is required to maintain the relay M in its closed position.

The plate current value range resulting in the oscillation of each of the relays M and O is fixed by the minimum value of the current through the energizing winding of the relay required to adjust the relay from its open to its closed position, and by the maximum value of the current through said winding which is insufficient to hold the relay in its closed position. The last mentioned current values in the case of each relay obviously depend upon the constants of the circuit, and particularly upon the relative impedances of the relay energizing winding and the resistances directly associated with each winding. The impedance of the windings 22 and 23 and the resistances 33 and 36 are advantageously quite high, as is explained in said Patent 2,267,682, and the resistances 34 and 37 are advantageously selected so that the operation of the relays does not tend to materially change the plate current of the tube R.

As explained in said Patent 2,267,682 condensers 39 and 40 are associated with the energizing circuits for the relays M and O to cooperate in timing the oscillation periods of said relays. The condensers 39 and 40 and a condenser 41 connected between the circuit conductors 20 and 21 cooperate to prevent the relays from chattering as a result of the half wave rectification action of the triode R and to increase the stability of relay action.

Resistances 42 and 43 shown as connected in series with one another between the terminals of the transformer secondary winding 15 and a condenser 44 connected in shunt to the resistances 14 and 42, collectively form a resistive-capacitive network S which is connected to the input circuit of the tube R and operates to effect a certain delay of the complete change in the grid potential of the tube R, resulting from a change in the illumination of the photo-electric cell Q. The resistive-capacitive network S connected in the input circuit of the electronic tube R is provided for delaying the complete change in grid potential of tube R following a change in the illumination of photocell Q. Thus, upon a sudden change in the illumination of photocell 33, the grid potential of tube R is substantially instantaneously changed a certain amount and is thereafter gradually changed further in the same direction, this action continuing until the condenser 44 of the network S has become fully charged for the particular value of photocell current.

As is explained in detail in said Patent 2,267,682, this action of network S tends to prevent hunting of the system as the potentiometer rebalancing contact F approaches its new balance position. Under this condition the galvanometer coil is traveling at full speed in advance of the rebalancing contact F and therefore may swing beyond its balance position, and thereby effect rotation of the motor D in the reverse direction thus setting up a hunting condition. For example, assume that the galvanometer is being advanced in the direction to increase the illumination of the photocell Q during the rebalancing operation, and thus rapidly increases the plate current of tube R up to and somewhat beyond the value required to close relay M so that relay 7 does not oscillate under this condition, but stays closed continuously. While the illumination continues to increase as relay M closes, the plate current of tube R can then increase only slowly because of the slower charging rate of condenser 44 as the latter becomes more fully charged.

When the relay M is closed, the advancing E. M. F. on the galvanometer is removed and the galvanometer motion decreases and thereby decreases the rate of increase of illumination, and although the illumination from the photocell is then higher than the value required to energize relay M to its closed position, action of the condenser 44 delays increase in the grid potential of the tube R, and prevents the grid potential from immediately assuming the value corresponding to the higher value of illumination of the photocell. During this period of delay the galvanometer is urged by its suspension bias back toward its balancing position, so that before the plate current of tube R can reach the closing current value for relay O, the illumination of the photocell will have reached the region of balance.

While the means shown in Fig. 1 through which the deflection of the galvanometer H adjusts the contact F do not differ essentially from the means shown in said Patent 2,267,682 for effecting rebalancing contact adjustments, the means now to be described for impressing an anticipating control voltage on the galvanometer H through the resistance I were devised and originated by me.

As previously stated, voltage is impressed on the resistance I through the resistance J' when the potentiometric circuit is unbalanced in one direction, and through the resistance J² when the potentiometric circuit is unbalanced in the opposite direction. To this end, the conductor 2 of Fig. 1 is connected to a stationary back contact 45 of the relay M and to a stationary front contact 46 of the relay O, and the positive terminal of the resistance J' is connected by a conductor 47 to the movable contact 48 of the relay M which engages the back contact 45 when the relay M is deenergized, and the negative terminal of the resistance J² is connected by a conductor 49 to the movable contact 50 of the relay O which engages the previously mentioned stationary front contact 46 when the relay O is deenergized. When the relay O is open the terminals of the resistance J' are thus connected to the terminals of the resistance I through circuit connections including the conductor I, the conductor 47, contacts 48 and 45 and the conductor 2. When the relay O is closed the terminals of the resistance J² are connected to the terminals of the resistance I through circuit connections comprising conductors I and 49, contacts 50 and 46, and conductor 2.

While the connection of the resistance J' to the resistance I does not depend on the condition of the relay O, and the connection of the resistance J² to the resistance I does not depend on the condition of the relay M, each of the resistances J' and J² can be energized by the rectifier K only when the relays M and O are both open or both closed. The energization of the resistances J' and J² is controlled by the relays M and O through relay contacts and conductors associated with said resistances in the circuit network J. The latter comprises a conductor 51 connecting the negative terminal of the resistance J² to the negative output terminal of the rectifier K. The positive output terminal of the rectifier K is connected by a conductor 52 to a movable contact 53 of the relay M. A stationary back contact of the relay M engaged by the contact 53 when the relay M is open, is connected by a conductor 54 to a stationary back contact of the relay O engaged by a movable contact 55 of the relay O when the latter is open. A conductor 56 connects stationary front contacts of the relays M and O, respectively engaged by the movable contacts 53 and 55 when both relays are closed. The movable contact 55 of the relay O is connected by a conductor 57 and resistances 58 and 59 to the positive terminal of the resistance J'.

Thus, as will be apparent, the rectifier K is operatively connected to and energizes the resistances J' and J², only when both relays M and O are open and the conductors 52 and 57 are connected through conductor 54, or when both relays are closed and the conductors 52 and 57 are connected by conductor 56. When either relay is open and the other relay is closed, the conductors 52 and 57 are disconnected from one another so that the resistances J' and J² cannot then be energized by the rectifier K.

The circuit network J includes a condenser 60 shown as having one terminal connected to the conductor 51 and having its second terminal connected to the connected terminals of the resistances 58 and 59. The circuit network J is thus a resistive-capacitive circuit network and was devised by me for the purpose of utilizing the oscillation characteristics of the relays M and O to increase and decrease the magnitude of the voltage impressed on the detection circuit by the resistance I, according as the extent of the rebalancing operation then underway is relatively large or relatively small. When, as a result of potentiometric circuit unbalance, relay M or relay O begins to oscillate, the corresponding relay contact, 53 or 55, alternately connects and disconnects conductors 52 and 57 in regular alternation. In consequence, a potential is stored by the condenser 60 of a magnitude corresponding to the portion of the total rebalancing time in which the conductors 52 and 57 are connected and thereby permit the circuit network J to be energized by the rectifier K.

The potential across condenser 60 which thus builds up to an extent dependent upon the length of the period in which either relay is in oscillation is impressed across and determines the potential drop in the resistances J' and J², and thereby determines the voltage which is then impressed on the detection circuit by the resistance I. In consequence, the extent to which the angular advancement of the galvanometer toward its balancing position is advanced by the action of the resistance I, increases with the duration of the rebalancing operation under way, and hence with the extent of the potentiometer network unbalance giving rise to the rebalancing operation. Not withstanding the intermittent character of the energization of the motor D occuring when either relay M or relay O is oscillating, the speed of the motor increases with the duration of the rebalancing operation, and the extent to which the motor will coast after being finally deenergized by the return of the galvanometer to its balancing position will be correspondingly increased.

The manner in which the anticipating control voltage impressed on the galvanometer circuit of Fig. 1 through the resistance I, is graduated may be summed up as follows: When the potentiometer is unbalanced, the extent of the unbalance determines the extent of galvanometer deflection away from its balancing position and determines the extent of adjustment of the contact F required to rebalance the potentiometric circuit, and therefore determines the period or time required to complete the rebalancing operation. When the rebalancing period is relatively long, the electric charge stored by the condenser 60 is larger than when said period is shorter. When the charge stored by the condenser is large, the voltage impressed on the galvanometer circuit is correspondingly large and results in a correspondingly large advance in the return of the galvanometer to its balancing position.

The graded anticipating control effects obtainable with the apparatus disclosed in Fig. 1 gives the practically important ultimate advantage of increasing the accuracy of the potentiometric measurements obtainable, by expediting the rebalancing operations without giving rise to hunting. An increase in the speed with which the rebalancing operations are effected contributes directly to increased measuring accuracy, by reducing the extent to which a given change or rate of change in the voltage measured can unbalance the potentiometric circuit, and a decrease in the extent of unbalance of itself contributes to a reduced hunting tendency.

While in Fig. 1 I have illustrated the embodiment of the invention in a self-balancing potentiometer comprising a shading coil rebalancing motor having a known form of control circuit characterized by its inclusion of control relays which oscillate under certain conditions, and in that embodiment have utilized the oscillating action of the relays to obtain a graded anticipatory control action. I can obtain that action in self-balancing potentiometers which do not have rebalancing motors of the shading coil type and do not have motor control circuits including oscillating relays.

Thus, for example, the self-balancing potentiometer shown in Fig. 2 comprises a reversible rebalancing motor DA without shading pole windings but having two energizing windings 61 and 62, and operating in one direction or the other accordingly as one or the other of said windings is energized. Furthermore, the energization of the windings 61 and 62 are controlled by relays MA and OA which do not oscillate as do the relays M and O of Fig. 1.

The self-balancing potentiometer shown in Fig. 2 comprises a potentiometric mesh work E and detection circuit branch shown as identical with those of Fig. 1, and a circuit through which the galvanometer H controls the energization of the relays MA and OA, said circuit being practically identical with the control circuit for the relays M and O, except that it includes no resistive-capacitive network corresponding to the network S of Fig. 1. To secure the same general security against hunting action of the rebalancing motor which the network S is employed to provide, I have devised and illustrated in Fig. 2, a novel rebalancing motor energizing circuit arrangement including delayed action relays T and U. As hereinafter explained, also, the means employed in Fig. 2 to impress anticipating control voltages on the galvanometer circuit resistance I differs substantially from those employed for the same purpose in Fig. 1.

The motor energizing winding 61 of Fig. 2 is energized by connecting its terminals 63 and 64 to alternating supply conductors L² and L', but in the balanced condition of the potentiometer, neither terminal is connected to the corresponding supply conductor. When the relay MA is deenergized its movable contact 8 connects the terminal 63 of winding 61 to a branch 65 from the supply conductor L², the conductor terminal 63 being connected to the contact 8 and the conductor 65 being connected to the stationary back contact cooperating with the movable contact 8. The second terminal of the winding 61 is connected to a branch 66 from the supply conductor L' by the switch element 67 of the delayed action relay T. The latter has its energizing coil 68 permanently connected between the conductor 66 and the terminal conductor 63.

While the connection of the conductor 63 to the conductor 65 thus closes the energizing circuit of the relay T, the latter is not operatively energized to connect the terminal conductor 64 to the conductor 66 and thereby energizes the motor winding 61 until after the expiration of a predetermined delay period. The operative energization of the relay T may be delayed, following the closure of the relay energizing circuit, in any convenient manner, as by the use of a copper ring 70 shown at one end of the relay T in Fig. 2, and forming a short circuited secondary winding for the latter.

The energization of the motor winding 62 is effected, following the closure of the relay OA, in a manner analogous to that in which the energization of the motor winding 61 is effected when the relay MA opens. The terminal 71 of the winding 62 is connected to the supply conductor branch 65 when the relay OA is closed by the engagement of the movable contact 9 of that relay with the corresponding stationary front relay contact, the latter being connected to the conductor 65 while the contact 9 is connected to the terminal 71. The second terminal 72 of the winding 62 is connected to the supply conductor branch 66 by the relay switch member 73 of the relay U when the latter is energized. The energizing coil 74 of the relay U is permanently connected between the conductors 66 and 71, but the operative energization of the relay U is delayed following the connection of terminal 71 and conductor 65, by a copper ring 70 at one end of the relay, just as is the energization of the relay T.

As will be apparent without further explanation, the delay action of the relays T and U of Fig. 2 provides protection against hunting due to the reversal of the motor DA when the anticipating control voltage causes the galvanometer H to momentarily overswing its balancing position before the contact F has attained its new balancing position. It will be observed that while relays T and U operate to delay the energization of the motor windings 61 and 62, following the opening of the relay MA and the closing of the relay OA, respectively, the deenergization of the motor windings is not similarly delayed. On the contrary, winding 61 is deenergized as soon as the relay MA closes and disconnects the conductors 63 and 65. Similarly, the opening of the relay OA immediately deenergizes the winding 62 by breaking the connection between the conductors 65 and 71.

The fact that the relays MA and OA do not oscillate under control conditions which cause the relays M and O to oscillate, is explained by differences in their respective energizing circuits. Thus the energizing circuits for the relay MA includes nothing corresponding to the resistance 34 of Fig. 1, and the resistance 33 of Fig. 2 is selected and employed for the purpose of making the opening and closing currents of the relay MA of nearly equal values. Similarly, the energizing winding for the relay OA includes no counterpart for the resistance 37 of Fig. 1, and the resistance 36 is selected to make the opening and closing currents for the relay OA nearly equal.

The resistances J' and J² of Fig. 2 are included in a circuit JA which differs from the circuit network J of Fig. 1, in that it does not include the condenser 60 of Fig. 1 or any equivalent therefore, and moreover, the circuit JA may be and as shown is continuously closed, its resistance 58 being directly connected to the positive terminal of the full wave rectifier K. In Fig. 2 the conductor 2 is connected to the positive terminal of the resistance J' when the relay MA is open, and is connected to the negative terminal of the resistance J² when the relay OA is closed, through circuit conductors and relay contacts 45—48 exactly like those employed for the same purpose in Fig. 1.

In Fig. 2, however, the conductor 1 is connected to one terminal of the resistance I through a resistance 75, and the second terminal of the resistance I is connected to an intermediate point of resistance 75 by a shunt connection including an adjustable resistance 76 and a condenser 77.

In the operation of the apparatus shown in Fig. 2 the operative connection of the resistance J' or J², connected between the conductors 1 and 2 by the opening of the relay MA or the closure of the relay OA, respectively produces a potential drop of one polarity or of the opposite polarity across the resistance I, which will gradually increase as the condenser 77 charges to a maximum value, depending upon the extent of potentiometric unbalance. By suitably choosing condenser 77, the time required to fully charge the latter may be that required to rebalance the potentiometer upon the occurrence of the largest expected unbalance, or the characteristics of the condenser 77 may be such that it will build the potential across the resistance I up to a maximum value during some particular time interval which may be less than that required to rebalance the potentiometer when its unbalance is the maximum expected.

As will be apparent, the arrangements shown in Figs. 1 and 2 permit of ready adjustments of the means for impressing an anticipating voltage on the resistance I such as may be required to calibrate the apparatus for optimum results under particular conditions of operation. Thus, for example, the maximum value of the anticipating voltage may be increased or decreased by varying the amount of resistance in the energizing circuit of the resistances J' and J², and to this end the resistance 58 is shown as an adjustable resistance. Furthermore, the rate at which the potential drop across the resistance I builds up, may be regulated by varying the operative effect of the condenser which regulates said rate. This may be effected, for example by adjustment of the adjustable resistance 76 which is in series with the condenser 77.

In Fig. 3 I have illustrated a modification of the rebalancing motor energizing circuit shown in Fig. 2, in which a single delayed action relay TA is employed to retard the separate energization of the two motor energizing windings 61 and 62. To this end, the terminals 64 and 72 of the windings 61 and 62 are connected by a conductor 78 to a switch contact which is connected to the branch alternating current supply conductor 66 by the movable switch member 79 of the relay TA, when the latter is energized. The energizing winding 80 of the relay TA has one terminal connected to a source 81 of D. C. current, and has its other terminal connected by a conductor 82 to the branch alternating current supply conductor 65. The second terminal of the D. C. current source 81 is connected by a conductor 83 to the midpoint of a resistance 84 connected between the terminal conductors 63 and 71 of the motor windings 61 and 62, respectively.

As will be apparent, when the relays MA and OA are both open, and the movable contact 8 of relay MA connects the motor terminal conductor 63 to the branch alternating supply conductor 65, an energizing circuit for the relay winding 80 is closed. That energizing circuit includes the winding 80, current source 81, the conductor 83, the portion of the resistance 84 directly connecting the conductor 83 to the motor terminal 63, the relay contact 8, and the conductors 65 and 82. The closure of the relay energizing circuit just described operatively energizes the relay winding 80 only after a suitable delay due to the action of the copper ring 70 at the end of the relay. When both of the relays MA and OA are closed, an energizing circuit for the winding 80 is closed, which differs from the circuit closed when both relays are open, in that it does not include the contact 8 of relay MA and lefthand portion of the resistance 84, but does include the righthand portion of the resistance 84 and the movable contact 9 of the relay OA.

While in accordance with the provisions of the statutes, I have illustrated and described the best forms of embodiment of my invention now known to me, it will be apparent to those skilled in the art that changes may be made in the form of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent, is:

1. In a self-balancing potentiometer, the combination of a potentiometric network including a potentiometer resistance, a detection circuit branch including a source of voltage to be measured and current responsive means, a contact in engagement with said resistance through which one end of said circuit branch is connected to said network, the other end of said branch being connected to said network at a point displaced from said contact, whereby said network is adapted to impress a voltage on said circuit branch opposing the voltage of said source, rebalancing means controlled by said current responsive means and comprising elements cooperating to effect an adjustment along said resistance of said contact on and in selective accordance with a variation in the voltage to be measured, and elements controlled by said current responsive means and operating independently of the first mentioned elements on said variation to impress a third voltage on said circuit branch opposite in direction to the resultant of the first and second mentioned voltages.

2. In a self-balancing potentiometer, the combination of a potentiometric network including a potentiometer resistance, a detection circuit branch including a source of voltage to be measured, a resistance and current responsive means, a contact in engagement with said potentiometer resistance through which one end of said circuit branch is connected to said network, the other end of said circuit branch being connected to said network at a point displaced from said contact, whereby said network is adapted to impress a voltage on said circuit branch opposing the voltage of said source, rebalancing means controlled by said current responsive means and comprising elements cooperating to effect an adjustment along said potentiometer resistance of said contact on and in selective accordance with variation in the voltage to be measured, and elements controlled by said responsive means and operating independently of the first mentioned elements on said variation to impress a voltage on the second mentioned resistance opposite in direction to the resultant of the first and second mentioned voltages.

3. In a self-balancing potentiometer, the combination of a potentiometric network including a potentiometric resistance, a detection circuit branch including a source of voltage to be measured and current responsive means, a contact in engagement with said resistance through which one end of said circuit branch is connected to said network, the other end of said branch being connected to said network at a point displaced from said contact, whereby said network is adapted to impress a voltage on said circuit branch opposing the voltage of said source, rebalancing means controlled by said current responsive means and comprising elements cooperating to effect an adjustment along said resistance of said contact on and in selective accordance with a variation in the voltage to be measured, and elements controlled by said current responsive means and operating independently of the first mentioned elements on said variation to impress a third voltage on said circuit branch in the direction to oppose the resultant of the first and second mentioned voltages and dependent in magnitude on the magnitude of said variation.

4. In a self-balancing potentiometer, the combination of a potentiometric network including a potentiometer resistance and a detection circuit branch including a source of voltage to be measured, a resistance and current responsive means, a contact in engagement with said potentiometer resistance through which one end of said circuit branch is connected to said network, the other end of said branch being connected to said network at a point displaced from said contact, rebalancing means controlled by said current responsive means and comprising elements cooperating to effect an adjustment of said contact along said resistance in a direction to reduce the current flow in said branch resulting from a variation in said voltage, a source of voltage, a condenser and elements controlled by said current responsive means and operating independently of the first mentioned elements for connecting the last mentioned source and said condenser in circuit with the second mentioned resistance to impress a voltage on the latter which opposes said current flow and increases as said condenser charges.

5. In a self-balancing potentiometer, the combination of a potentiometric network including a potentiometer resistance, a detection circuit branch including a source of voltage to be measured and current responsive means, a contact in engagement with said resistance through which one end of said circuit branch is connected to said network, the other end of this branch being connected to said network at a point displaced from said contact whereby said network is adapted to impress a voltage on said circuit branch opposing the voltage of said source, circuit rebalancing means controlled by said current responsive means and including an oscillating relay and operating to effect an adjustment along said resistance of said contact on and in selective accordance with a variation in the voltage to be measured, and means including a resistive-capacitive circuit mesh associated with said relay for impressing a third voltage on said circuit branch dependent in magnitude on the number of oscillations of said relay occurring while said adjustment is being effected and opposite in direction to the resultant of the first and second mentioned voltages.

6. In a self-balancing potentiometer, the combination of a potentiometric network including a potentiometer resistance, a detection circuit branch including a source of voltage to be measured and a galvanometer having a balancing position from which it deflects on a change in said voltage, a contact engaging and adjustable along said resistance and through which one end of said circuit branch is connected to said network, the other end of said circuit branch being connected to the network at a point displaced from said contact, rebalancing means controlled by said galvanometer and including a reversible motor for effecting an adjustment of said contact along said resistance on and in selective accordance with said voltage change, and means operating independently of said motor but in accordance with the magnitude of said voltage change for advancing the return of the galvanometer to its balancing position more or less, accordingly as said adjustment is relatively large or relatively small.

7. In a self-balancing potentiometer, the combination of a potentiometric network including a potentiometer resistance, a detection current branch including a source of voltage to be measured and a galvanometer having a balancing position from which it deflects in one direction or the other on a change in said voltage in one direction or the other, a contact engaging and adjustable along said resistance and through which one end of said circuit branch is connected to said network, the other end of said circuit branch being connected to said network at a point displaced from said contact, a reversible rebalancing motor for adjusting said contact along said resistance and energizing means for said motor controlled by said galvanometer in selective accordance with the direction of deflection of the galvanometer from its balancing position and including a delayed action relay preventing the energization of said motor by the deflection of said galvanometer from its balancing position when said deflection is followed by a prompt return deflection.

8. In a self-balancing potentiometer, the combination of a potentiometric network including a potentiometer resistance and a detection current branch including a source of voltage to be measured and a galvanometer having a balancing position from which it deflects in one direction or the other on a change in said voltage in one direction or the other, and a contact engaging and adjustable along said resistance and through which one end of said circuit branch is connected to said network, the other end of said circuit branch being connected to said network at a point displaced from said contact, a reversible rebalancing motor for adjusting said contact along said resistance and comprising two energizing windings and adapted to operate in one direction or the other accordingly as one or the other of said windings is energized, and means including delayed action relay means set into operation by said galvanometer to effect a delayed energization of one or the other of said windings on a deflection of said galvanometer in one direction or the other from its balancing position and rendered inoperative to complete said energization by said galvanometer when its said deflection from its balancing position is followed by a quick return deflection.

9. In a self-balancing potentiometer, the combination of a potentiometric network including a potentiometer resistance and a detection current branch including a source of voltage to be measured and a galvanometer having a balancing position from which it deflects in one direction or the other on a change in said voltage in one direction or the other, a contact engaging and adjustable along said resistance and through which one end of said circuit branch is connected to said network, the other end of said circuit branch being connected to said network at a point displaced from said contact, a reversible rebalancing motor for adjusting said contact along said resistance, energizing means for said motor controlled by said galvanometer in selective accordance with the direction of deflection of the galvanometer from its balancing position and including a delayed action relay preventing the energization of said motor when said galvanometer momentarily overswings its balancing position in either direction following a deflection from said position in the opposite direction.

10. In a self-balancing potentiometer, the combination of a potentiometric network including a potentiometer resistance and a detection current branch including a source of voltage to be measured and a galvanometer having a balancing position from which it deflects in one direction or the other on a change in said voltage in one direction or the other, a contact engaging and adjustable along said resistance and through which one end of said circuit branch is connected to said network, the other end of said circuit branch being connected to said network at a point displaced from said contact, a reversible rebalancing motor for adjusting said contact along said resistance and motor energizing means controlled by said galvanometer and comprising quick action and delayed action relays and operative to energize said motor at the end of a predetermined time period following the deflection of the galvanometer to one side of the balancing position and during which said galvanometer has not returned to its balancing position and operative immediately on the return of the galvanometer to its balancing position to deenergize said motor if the latter is then energized.

11. In a self-balancing potentiometer, the combination of a potentiometric network including a potentiometer resistance and a detection current branch including a source of voltage to be measured and a galvanometer having a balancing position from which it deflects in one direction or the other on a change in said voltage in one direction or the other, a contact engaging and adjustable along said resistance and through which one end of said circuit branch is connected to said network, the other end of said circuit branch being connected to said network at a point displaced from said contact, a reversible rebalancing motor for adjusting said contact along said resistance and means including two switches for energizing said motor when both switches are closed but inoperative to energize said motor when either switch is open, means through which said galvanometer closes and opens one of said switches immediately on its deflection respectively away from and back to its balancing position and a delayed action relay through which said galvanometer closes the second of said switches at the end of a predetermined time interval following the galvanometer deflection away from its balancing position and opens the last mentioned switch, if the latter is then closed, immediately after the galvanometer deflects back to its balancing position.

12. In a self-balancing potentiometer, the combination of a potentiometric network including a potentiometer resistance, a detection circuit branch including a source of voltage to be measured and a galvanometer having a balancing position from which it deflects on a change in said voltage, a contact engaging and adjustable along said resistance and through which one end of said circuit branch is connected to said network, the other end of said circuit branch being connected to the network at a point displaced from said contact, rebalancing means controlled by said galvanometer and including a reversible motor for effecting an adjustment of said contact along said resistance on and in selective accordance with said voltage change, and means advancing the return of the galvanometer to its balancing position and thereby deenergizing said motor before said contact is adjusted into its balancing position and means preventing reverse operation of the motor when the galvanometer in its return movement momentarily overswings its balancing position.

13. In a self-balancing potentiometer the combination of a potentiometric network including a potentiometer resistance and a detection circuit branch including a source of voltage to be measured, a resistance and current responsive means, a contact in engagement with said potentiometer resistance through which one end of said circuit branch is connected to said network, the other end of said circuit branch being connected to said network at a point displaced from said contact whereby said network is adapted to impress a voltage on said circuit branch opposing the voltage of said source, a reversible rebalancing motor operating to adjust said contact along said resistance, a motor control circuit including electronic amplifying means through which said current responsive means control the operation of said motor, anticipating voltage means controlled by said current responsive means and operating on a change in the first mentioned voltage to impress a unidirectional voltage on said detection circuit branch opposite in direction to the resultant of the first and second mentioned voltages, a rectifier supplying unidirectional voltage to said anticipating voltage means, and a transformer having a plurality of secondary winding sections one of which supplies said rectifier with current rectified by the latter and others of which supply energizing voltages to said control circuit.

HARRY S. JONES.